United States Patent
Mussmann et al.

(10) Patent No.: US 6,601,381 B2
(45) Date of Patent: Aug. 5, 2003

(54) PROCESS FOR OPERATING AN EXHAUST GAS TREATMENT DEVICE FOR A GASOLINE ENGINE

(75) Inventors: Lothar Mussmann, Offenbach (DE); Dieter Lindner, Hanau (DE); Martin Votsmeier, Bruchköbel (DE); Joerg Michael Richter, Frankfurt am Main (DE); Egbert Lox, Hanau (DE)

(73) Assignee: dmc2 Degussa Metal Catalysts Cerdec AG, Hanau-Wolfgang (DE)

( * ) Notice: Subject to any disclaimer, the term of this patent is extended or adjusted under 35 U.S.C. 154(b) by 0 days.

(21) Appl. No.: 09/855,743

(22) Filed: May 16, 2001

(65) Prior Publication Data

US 2002/0005039 A1 Jan. 17, 2002

(30) Foreign Application Priority Data

May 20, 2000 (DE) .......................................... 100 25 034

(51) Int. Cl.[7] ................................................. F01N 3/00
(52) U.S. Cl. ............................. 60/274; 60/276; 60/285
(58) Field of Search .......................... 60/274, 276, 277, 60/285; 73/118.1

(56) References Cited

U.S. PATENT DOCUMENTS

| | | | | |
|---|---|---|---|---|
| 4,739,614 A | * | 4/1988 | Katsuno et al. | 60/274 |
| 4,809,501 A | * | 3/1989 | Kayanuma et al. | 60/276 |
| 4,817,384 A | * | 4/1989 | Okumura et al. | 60/285 |
| 5,117,631 A | * | 6/1992 | Moser | 60/285 |
| 5,313,791 A | * | 5/1994 | Hamburg et al. | 60/277 |
| 5,392,598 A | * | 2/1995 | White et al. | 60/276 |
| 5,619,852 A | * | 4/1997 | Uchikawa | 60/285 |
| 5,693,877 A | * | 12/1997 | Ohsuga et al. | 73/118.1 |
| 5,771,688 A | * | 6/1998 | Hasegawa et al. | 60/276 |
| 5,848,528 A | * | 12/1998 | Liu | 60/285 |
| 5,953,910 A | * | 9/1999 | Sato et al. | 60/277 |
| 5,974,788 A | * | 11/1999 | Hepburn et al. | 60/285 |
| 6,151,888 A | * | 11/2000 | Schneider et al. | 60/277 |

* cited by examiner

Primary Examiner—Thomas Denion
Assistant Examiner—Tu M. Nguyen
(74) Attorney, Agent, or Firm—Kalow & Springut LLP

(57) ABSTRACT

A process for operating an exhaust gas treatment device in a gasoline engine which is operated mainly with a stoichiometric air/fuel ratio and is operated with a rich-mix air/fuel ratio when accelerating or under full load. The exhaust gas treatment device contains a three-way converter catalyst and a first lambda probe upstream of the catalyst and a second lambda probe downstream of the catalyst. The air/fuel ratio is controlled by using the signal from the first lambda probe, whereas the signal from the second lambda probe is used to check the first lambda probe (trim control) and to diagnose the function of the catalyst. Trim control with the second lambda probe is enabled only when, in the event of rich exhaust gas, the voltage difference between the probe voltage for the second lambda probe and a set point voltage is not larger than a predetermined value.

1 Claim, No Drawings

PROCESS FOR OPERATING AN EXHAUST GAS TREATMENT DEVICE FOR A GASOLINE ENGINE

INTRODUCTION AND BACKGROUND

The present invention relates to a process for operating an exhaust gas treatment device for a gasoline engine. The process avoids in particular erroneous control of the air/fuel ratio for the engine in the case of fresh catalysts which contain oxygen storage components in high concentration.

Gasoline engines are operated substantially with a stoichiometric air/fuel ratio. When accelerating or under full load, however, operating phases with a rich air/fuel ratio occur. To purify the exhaust gas from this type of engine, so-called three-way converter catalysts are used, these being able simultaneously to convert the three harmful substances in the exhaust gas, that is hydrocarbons (HC), carbon monoxide (CO) and nitrogen oxides (NOx), into the harmless products water, nitrogen and carbon dioxide.

A prerequisite for the simultaneous conversion of the three harmful substances is that the exhaust gas is composed approximately stoichiometrically. For this purpose, an oxygen probe is inserted into the exhaust gas pipe from the engine, upstream of the catalyst, this being used to control the air/fuel ratio in the engine. This probe is also frequently called a lambda probe ($\lambda$-probe).

Lambda is the ratio of the current air/fuel ratio to the stoichiometric air/fuel ratio. It is also called the normalized air/fuel ratio. A stoichiometrically composed air/fuel mixture has a normalized air/fuel ratio $\lambda=1$. A superstoichiometrically composed air/fuel mixture is called to be lean and has a normalized air/fuel ratio $\lambda>1$, whereas a substoichiometrically composed, rich air/fuel mixture has a normalized air/fuel ratio $\lambda<1$.

Modem three-way converter catalysts contain a high concentration of oxygen storing materials, generally cerium oxide or mixed oxides based on cerium oxide, which provide the catalyst with good dynamic characteristics, that is to say these catalysts are able successfully to convert all three harmful substances even when the air/fuel ratio departs from the ideal stoichiometric ratio and acquires rich or lean values as a result of rapidly changing operating conditions for the engine.

The catalytic function of a catalyst can be damaged in a variety of ways. Apart from reversible or permanent damage to catalysts by catalyst poisons, catalysts may also be permanently damaged by thermal overloading at temperatures higher than 800° C. Due to high exhaust gas temperatures, the catalytically active components may be subjected to sintering and thus to a decrease in the specific surface area of the materials from which the catalysts are composed. The oxygen storing materials are particularly affected so that, with increasing ageing of the catalyst, its catalytic activity and in particular also its dynamic conversion of harmful substances, becomes impaired.

For future motor vehicles, therefore, so-called on-board-diagnosis systems are stipulated which are intended constantly to monitor the function of the exhaust gas treatment catalyst in order to be able to detect faulty functions in good time. An essential factor for diagnosis concerns, for the reasons given above, is the oxygen storage capacity of the catalyst. In order to check the oxygen storage capacity, in addition to the lambda probe upstream of the catalyst, a second lambda probe is inserted downstream of the catalyst in the exhaust gas pipe from the engine. As a result of suitable evaluation of the signals from the two probes, according to DE41 28 823, a conclusion can be drawn about the oxygen storage capacity of the catalyst.

In addition, the second lambda probe is also used to check for correct functioning of the first lambda probe and to compensate for possible changes in the probe characteristics due to ageing. Thus, the second lambda probe acts as the master probe for performing a so-called trim control in order always to ensure optimum conversion of harmful substances.

Substantially two different types of lambda probes are known, so-called lambda linear probes and lambda two-point probes. Linear probes provide a probe signal which increases linearly with the oxygen content of the exhaust gas. A two-point probe, in contrast, provides a probe voltage which essentially acquires only two distinct voltage levels with a steep transition region in between. On overshooting or undershooting a threshold value for oxygen concentration in the exhaust gas, the probe voltage jumps from one level to the other. Under lean exhaust gas conditions, the probe voltage lies below about 200 mV. Under rich exhaust gas conditions, the probe gives an output voltage which lies typically between 600 and 900 mV. The probe voltage has a steep gradient in the transition region around lambda=1. Lambda linear probes are also called UEGO (universal exhaust gas oxygen) probes and lambda two-point probes are also called HEGO (heated exhaust gas oxygen) probes. The mode of functioning of these lambda probes is described in the Bosch "Vehicle technical manual", VDI Verlag, 20th edition dated 1995, pages 490 to 492.

It has now been observed that trim control with fresh catalysts with a high concentration of cerium oxide leads to an increase of the air/fuel ratio during acceleration phases. This is associated with intense breakthrough of nitrogen oxides via the catalyst so that, with fresh catalysts, the exhaust gas standards cannot be complied with. Only in the case of aged catalysts does trim control work as expected and enables compliance with the strict exhaust gas standards.

Therefore, an object of this invention is to provide a process in which errors in trim control with fresh catalysts do not have a harmful effect or can be avoided.

SUMMARY OF THE INVENTION

The above and other objects of the invention can be achieved by a process for operating an exhaust gas treatment system in cooperation with a gasoline engine which is operated mainly with a stoichiometric air/fuel ratio and is operated with a rich air/fuel ratio when accelerating or under full load, wherein the exhaust gas treatment system contains a three-way converter catalyst and a first lambda probe upstream of the catalyst and a second lambda probe downstream of the catalyst and the sir/fuel ratio is controlled by using the signal from the first lambda probe and the signal form the second lambda probe is used to check the first lambda probe (trim control) and to diagnose the function of the catalyst. It is a feature of the process of the invention that trim control with the second lambda probe is enabled only when, in the event of rich exhaust gas, the voltage difference between the probe voltage for the second lambda probe and a set point voltage is not larger than a predetermined value.

During the calibration phase for the particular type of catalyst, the probe voltage downstream of the catalyst is determined as a function of the operating point of the engine for the relevant optimum conversion of harmful substances and stored as a set point for trim control in the engine control system. Now, in the case of fresh catalysts, it has been shown that the probe downstream of the catalyst erroneously provides voltages which are far too high. Whereas, for example, with aged catalysts for an air/fuel mixture with λ=0.98 the probe voltage downstream of the catalyst is about 650 mV, it may increase to 900 mV with fresh catalysts. The engine control system tries to reduce this too high value to the set point of, for example, 650 mV and accordingly increases the air/fuel ratio of the air/fuel mixture supplied to the engine, with the result described above of high nitrogen oxide breakthroughs via the catalyst.

DETAILED DESCRIPTION OF INVENTION

Without claiming a scientifically exact explanation, it is assumed that the problems with trim control with fresh catalysts are closely connected with the large active surface area of the cerium oxide contained in modem three-way converter catalysts. It is known that cerium oxide catalyses the water gas shift reaction in accordance with reaction equation (1) under rich exhaust gas conditions. Carbon monoxide and water are converted to hydrogen and carbon dioxide in an exothermic reaction:

$$CO + H_2O \Longleftrightarrow H_2 + CO_2 \tag{1}$$

It is assumed that this reaction proceeds especially effectively on fresh catalysts and thus leads to increased production of hydrogen. In fact, increased hydrogen production can be detected experimentally on fresh catalysts. With catalyst temperatures above 500° C., concentrations of hydrogen in exhaust gas of up to 18000 ppm were measured. The change in hydrogen emissions correlates with the too high probe voltages for the probe located downstream of the catalyst.

In the case of aged catalysts, the observed hydrogen emission and the overvoltage attributed thereto are reduced to the extent that they no longer have a harmful effect on trim control. Adequate ageing is present only when the catalyst has been operated for a certain time with exhaust gas temperatures of more than 800° C. Generally the catalyst has been adequately aged after the vehicle has been driven over a distance of about 50 to 100 km.

To avoid the problems with trim control with fresh catalysts, the trim control can be switched off during the initial operating hours for the vehicle. Since, however, the ageing of catalysts is not predictable due to the different modes of operating motor vehicles fitted with catalysts, it is suggested that the trim control system be activated only when the probe voltage of the second lambda probe does not exceed a predetermined voltage difference above a set point voltage during acceleration or under fill load.

A value of 650 mV has proved suitable as a set point voltage. However, this value may be moved to a different value, depending on the type of probe. For the voltage difference below which the trim control system is activated, a value between 30 and 60 mV has proved suitable.

In a preferred embodiment of the process, the trim control system remains active even with fresh catalysts. In this embodiment of the process according to the invention, the water gas shift reaction due to oxidation of carbon monoxide to carbon dioxide is suppressed. For this purpose, during acceleration or under full load, the rich air/fuel ratio required is set only as the mean value of an air/fuel ratio modulated at 0.5 to 5 Hz, wherein the amplitude of the modulation is such that the air/fuel ratio oscillates to and fro between lean and rich values. The production of hydrogen during operating phases with rich exhaust gas compositions is thus actively suppressed by the superposition of high-frequency lean phases.

We claim:

1. A process for operating an exhaust gas treatment system for purifying the exhaust gas from a gasoline engine which is operated mainly with a stoichiometric air/fuel ratio and is operated with a rich air/fuel ratio when accelerating or under full load, wherein the exhaust gas treatment system includes a three-way converter catalyst and a first lambda probe upstream of the catalyst and a second lambda probe downstream of the catalyst comprising controlling the air/fuel ratio by using a signal from the first lambda probe and using a signal from the second lambda probe to check the first lambda probe for trim control and diagnosing functioning of the catalyst, wherein during acceleration or under full load, the rich air fuel/ratio required is set only as a mean value with an air/fuel ratio modulated at 0.5 to 5 Hz, wherein the amplitude of the modulation is such that the air/fuel ratio oscillates to and fro between lean and rich values.

* * * * *